May 22, 1962 R. W. DRAKE ET AL 3,035,620
FRUIT PREPARATION MACHINE
Filed Oct. 22, 1957 8 Sheets-Sheet 1
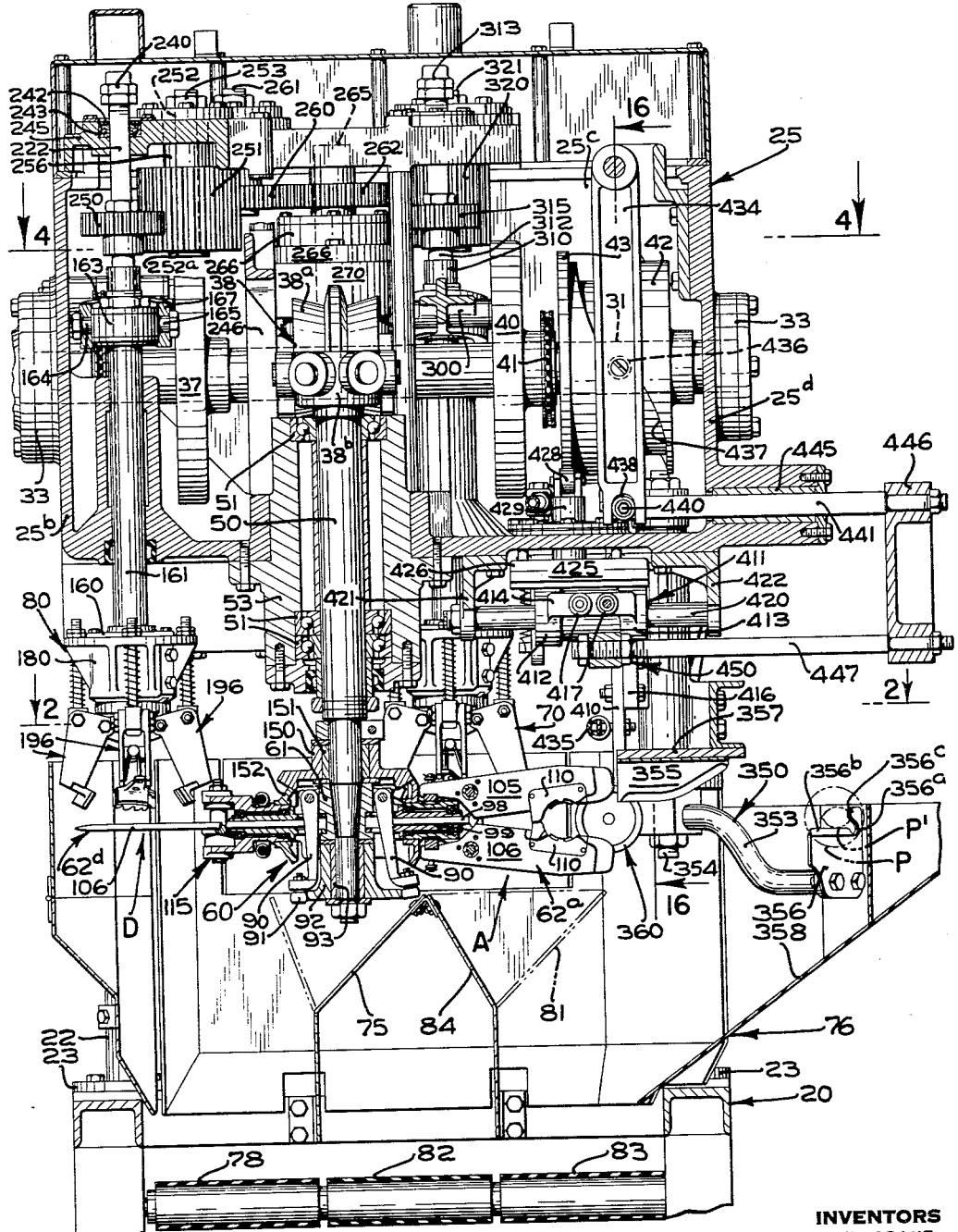
FIG_1
INVENTORS
ROBERT W. DRAKE
SHERMAN H. CREED
BY Hans G. Hoffmeister
ATTORNEY

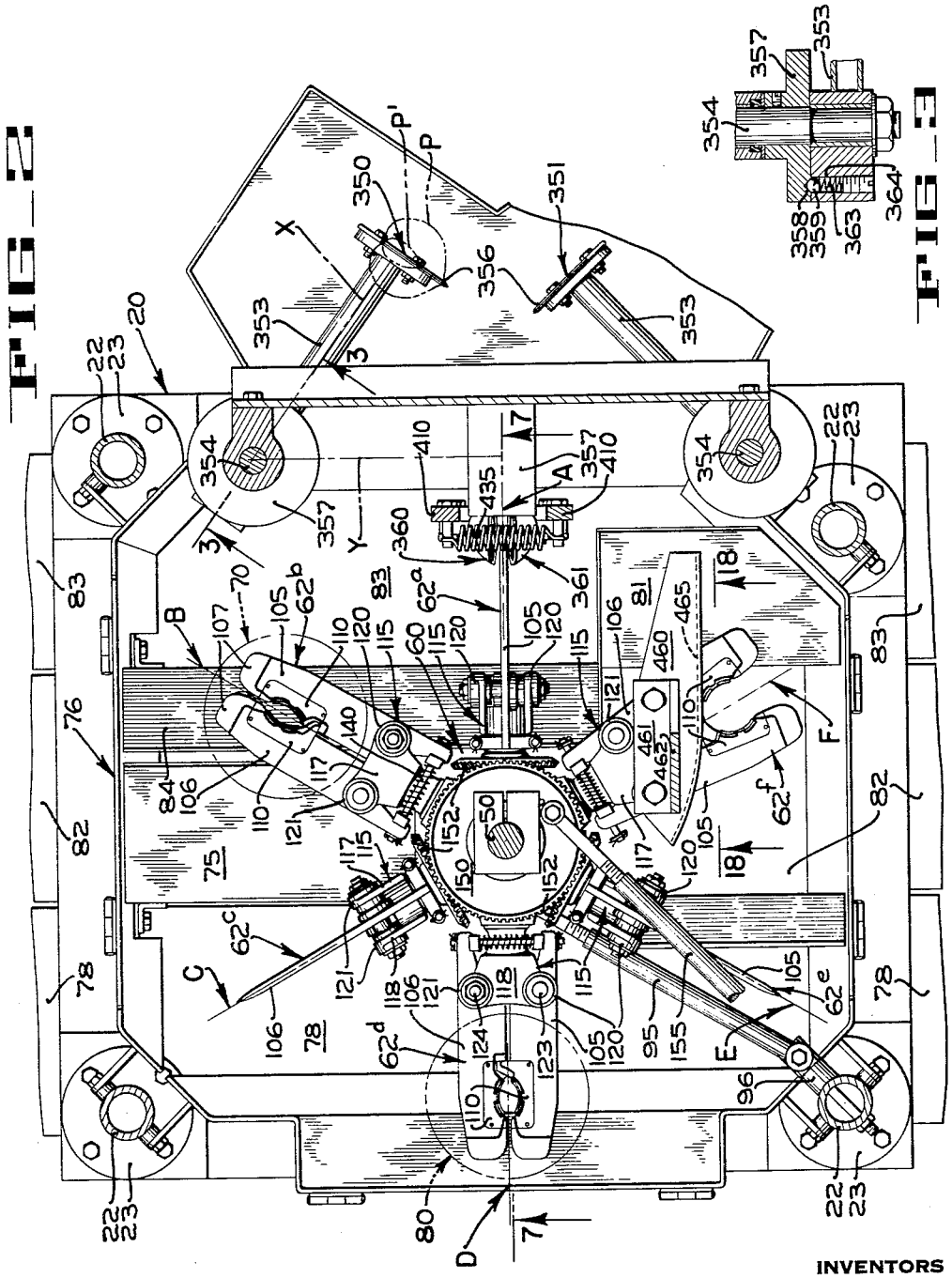

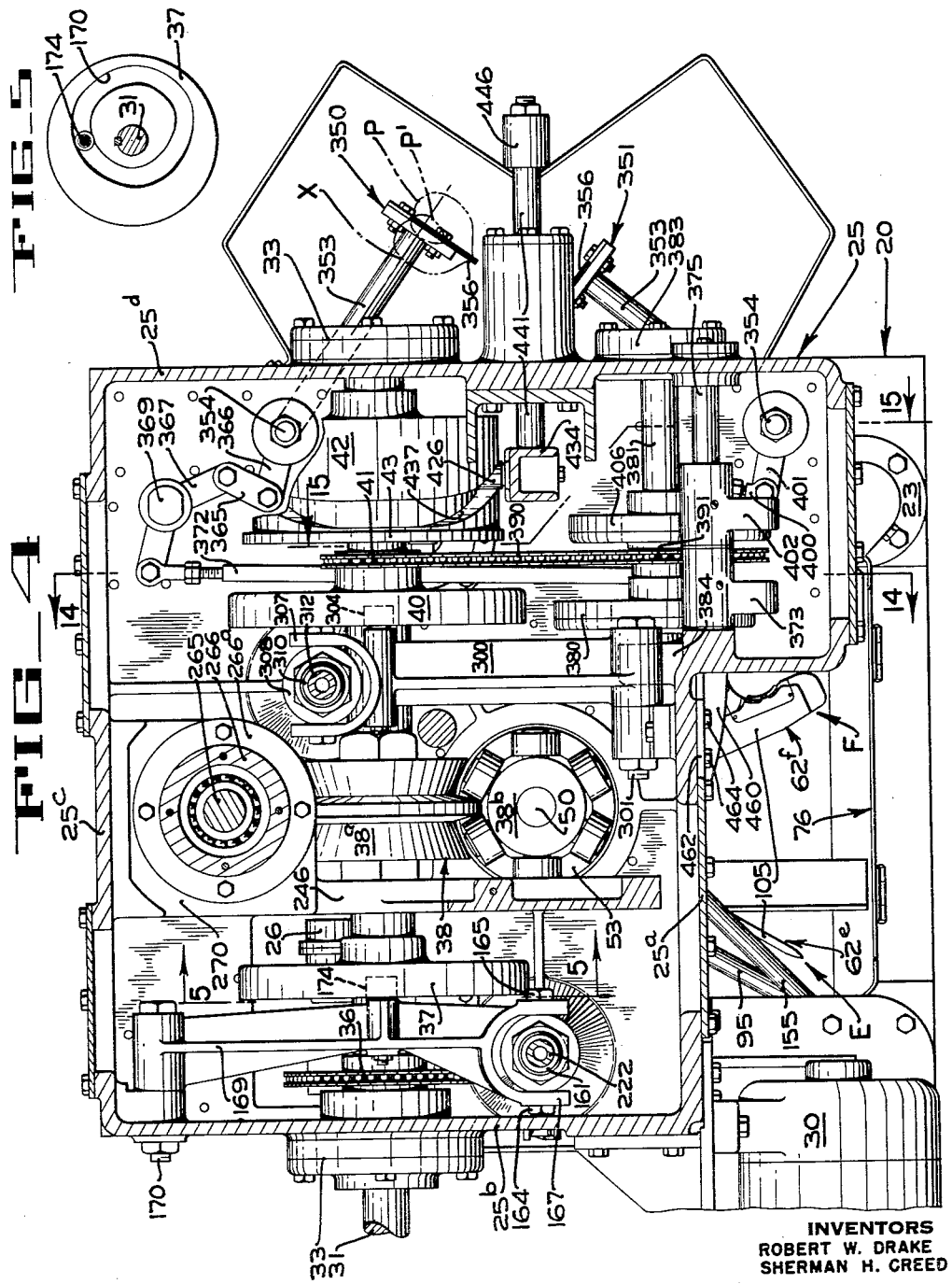

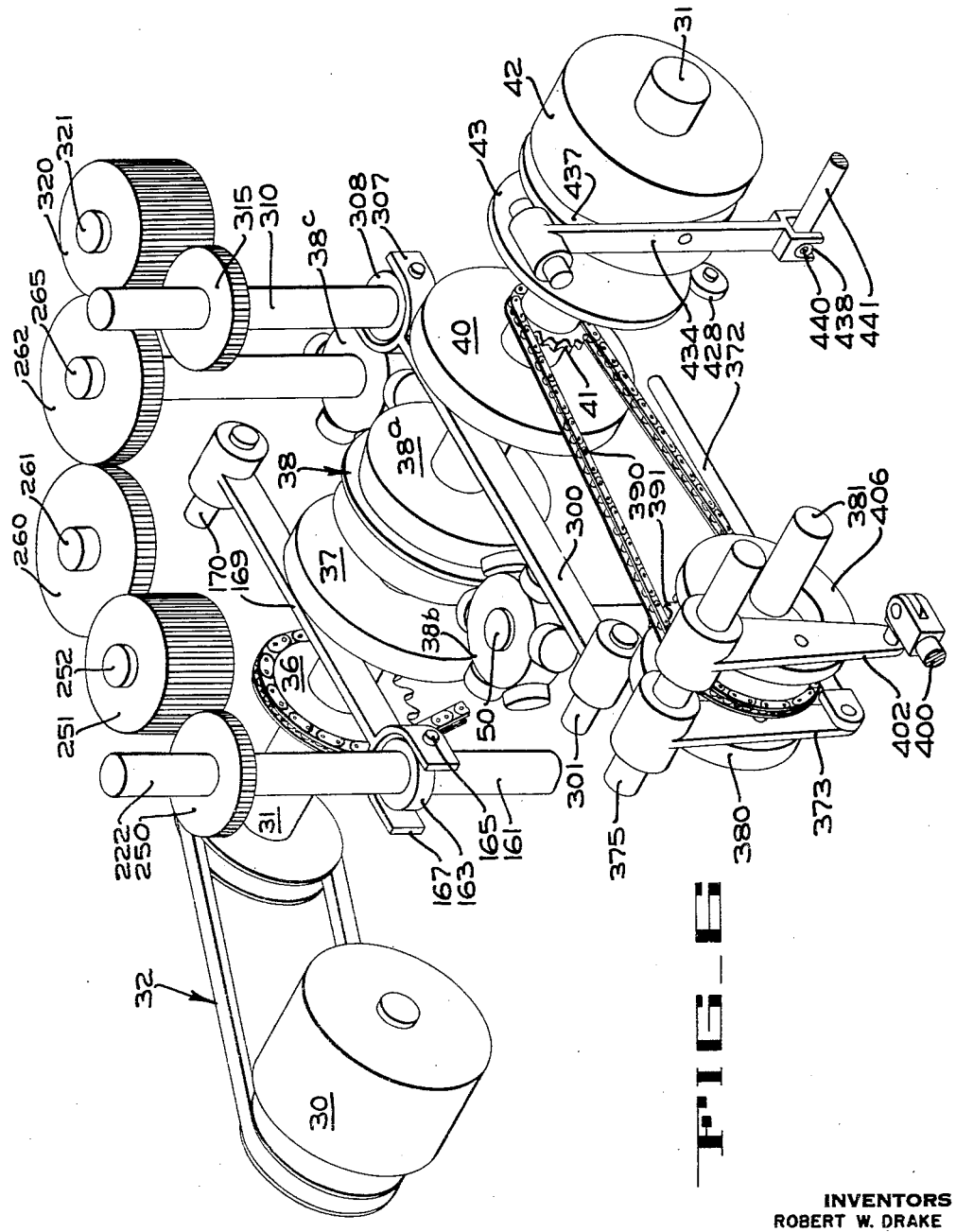

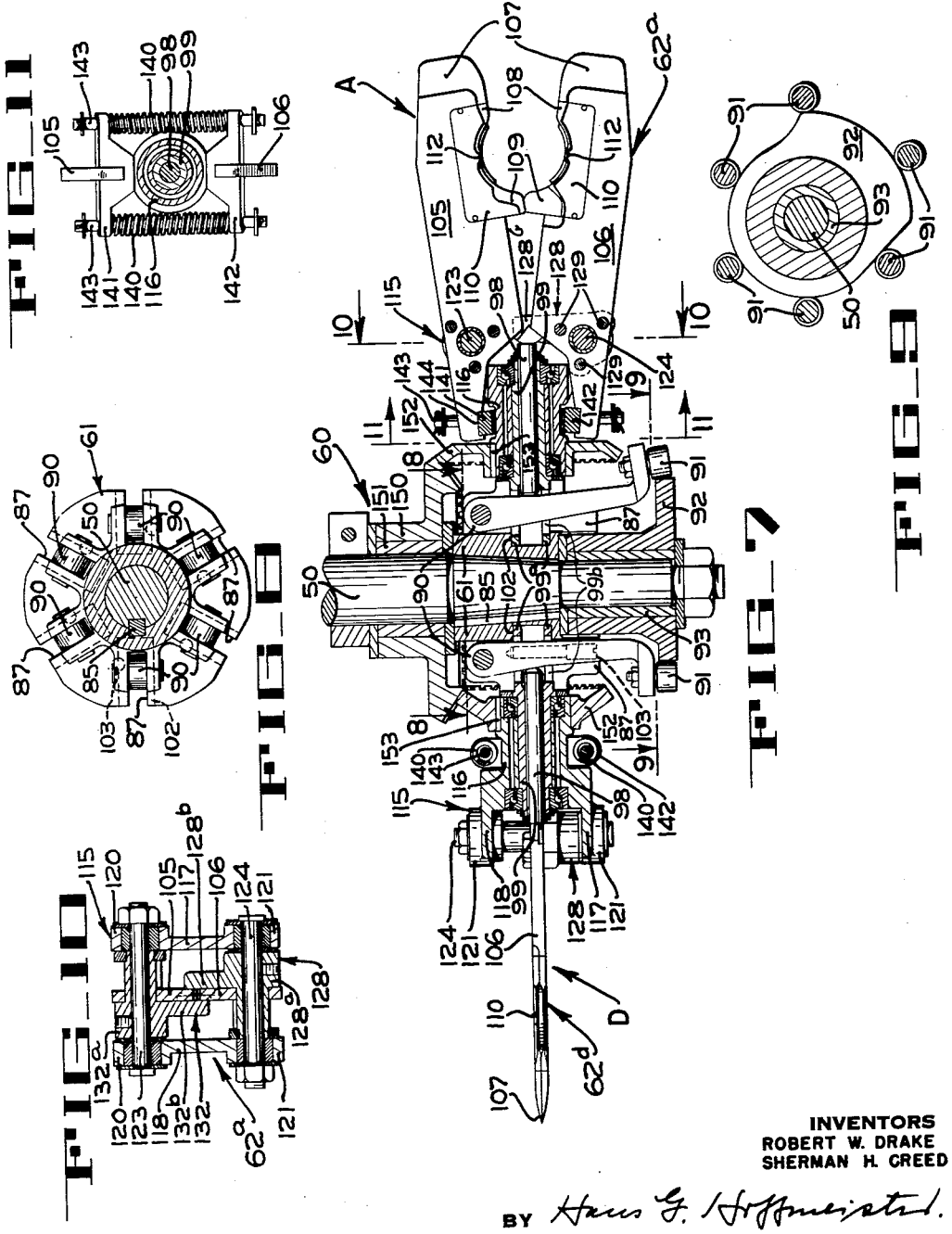

INVENTORS
ROBERT W. DRAKE
SHERMAN H. CREED

BY Hans G. Hoffmeister
ATTORNEY

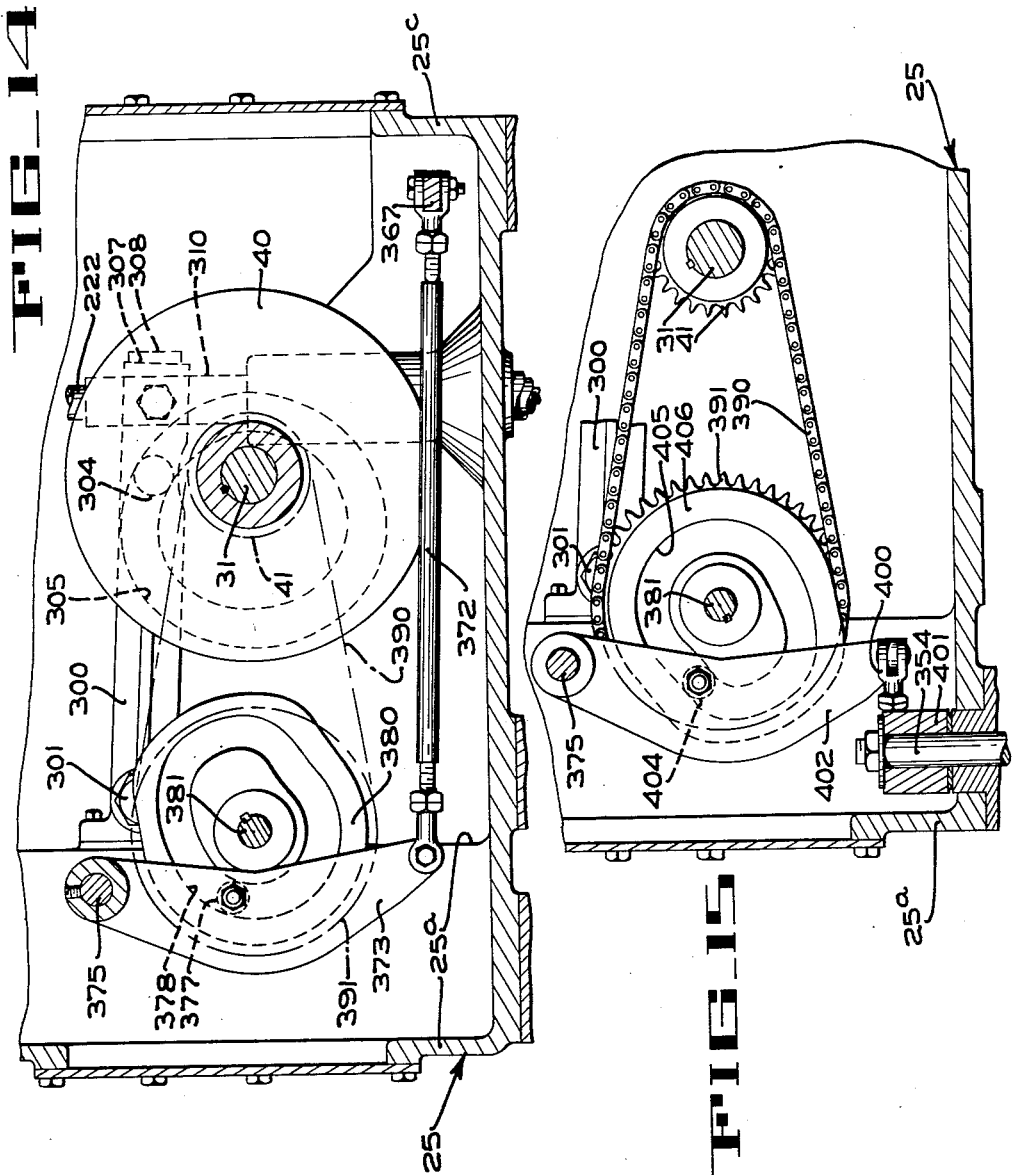

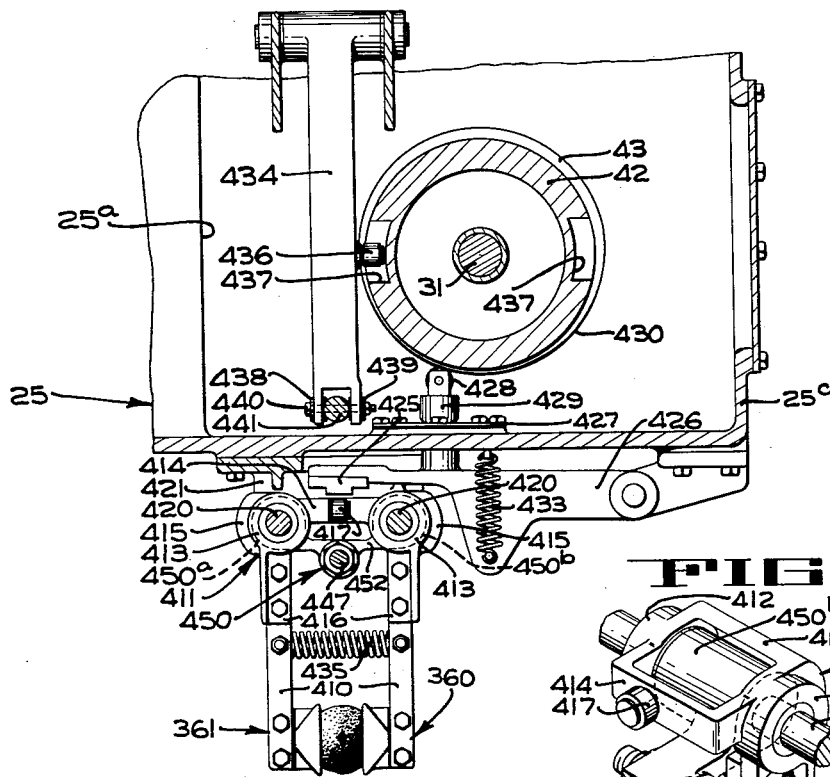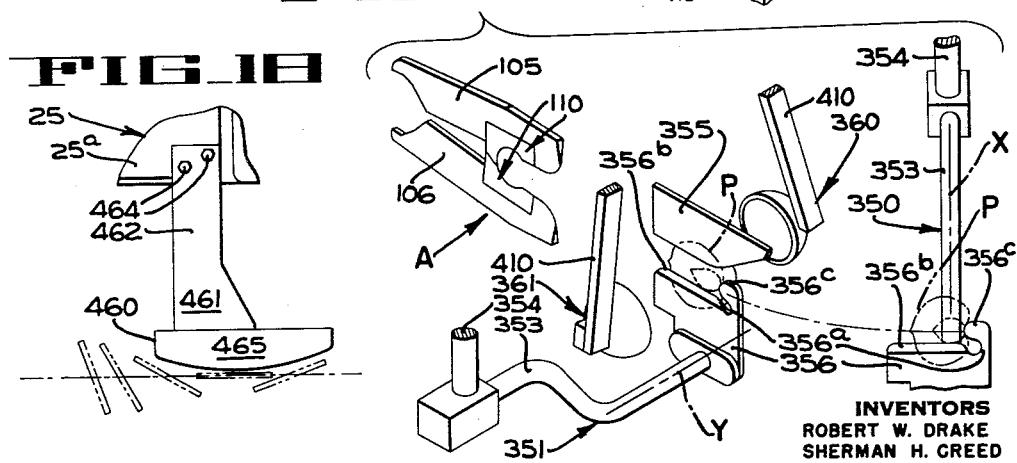
INVENTORS
ROBERT W. DRAKE
SHERMAN H. CREED
BY Hans G. Hoffmeister
ATTORNEY United States Patent Office 3,035,620
Patented May 22, 1962

3,035,620
FRUIT PREPARATION MACHINE
Robert W. Drake, San Jose, and Sherman H. Creed, Santa Clara County, Calif., assignors to FMC Corporation, a corporation of Delaware
Filed Oct. 22, 1957, Ser. No. 691,620
18 Claims. (Cl. 146—28)

This invention pertains to the preparation of fruit and more particularly relates to a method of preparing fruit and a machine for carrying out the method.

In one method of pitting peaches, each peach is bisected by blades having serrated edges which penetrate the peach and grip the pit. While the pit is held in fixed position, twisting heads engage the peach halves and twist the halves in opposite directions to free them from the pit. Machines for carrying out the twist pitting of peaches have been generally unsatisfactory due to the inherent difficulty, in the twist pitting operation, of contacting and firmly gripping the pit and in contacting and gripping the peach half during the twisting operation.

An object of the present invention is to provide an improved machine for a twist pitting machine.

Another object is to provide an efficient twisting head for a twist pitting machine.

Another object is to provide a novel drive mechanism for a twist pitting machine.

Another object is to provide an improved control mechanism for the various operating members of a machine for twist pitting peaches.

Another object is to provide a peach pitting machine capable of making a three way separation of pitted peach halves, pits, and peach halves having split pit fragments.

Another object is to provide an improved method of pitting peaches.

Another object is to provide a novel feed mechanism for feeding peaches to the peach cutting and pit gripping blades of a peach pitting machine.

Another object is to provide an improved pit ejecting mechanism for a pitting machine.

Another object is to provide a novel, efficient blade assembly for twist pitting machines.

Other and further objects of the present invention will become apparent from the following description taken in connection with the accompanying drawings, in which:

FIG. 1 is a vertical section, with parts broken away, taken centrally through the peach pitting machine of the present invention.

FIG. 2 is an enlarged fragmentary horizontal section taken on line 2—2 of FIG. 1.

FIG. 3 is an enlarged fragmentary vertical section taken on line 3—3 of FIG. 2.

FIG. 4 is an enlarged fragmentary horizontal section taken on line 4—4 of FIG. 1.

FIG. 5 is a reduced vertical section taken on line 5—5 of FIG. 4.

FIG. 6 is a diagrammatic showing of the drive and control mechanism shown in FIG. 1.

FIG. 7 is a vertical section taken with parts in elevation taken substantially on line 7—7 of FIG. 2.

FIG. 8 is a horizontal section taken on lines 8—8 of FIG. 7.

FIG. 9 is a horizontal section taken on lines 9—9 of FIG. 7.

FIG. 10 is a vertical section taken on lines 10—10 of FIG. 7.

FIG. 13 is an enlarged fragmentary section taken centrally through the head of FIG. 12.

FIG. 14 is a fragmentary enlarged vertical section taken on lines 14—14 of FIG. 4.

FIG. 15 is an enlarged vertical section taken on line 15—15 of FIG. 4.

FIG. 16 is a fragmentary section taken on line 16—16 of FIG. 1.

FIG. 17 is an enlarged fragmentary perspective view of a portion of FIG. 16.

FIG. 18 is a reduced vertical section taken on line 18—18 of FIG. 2.

FIG. 19 is a schematic view of the feed mechanism used in the present machine.

Figure 11:
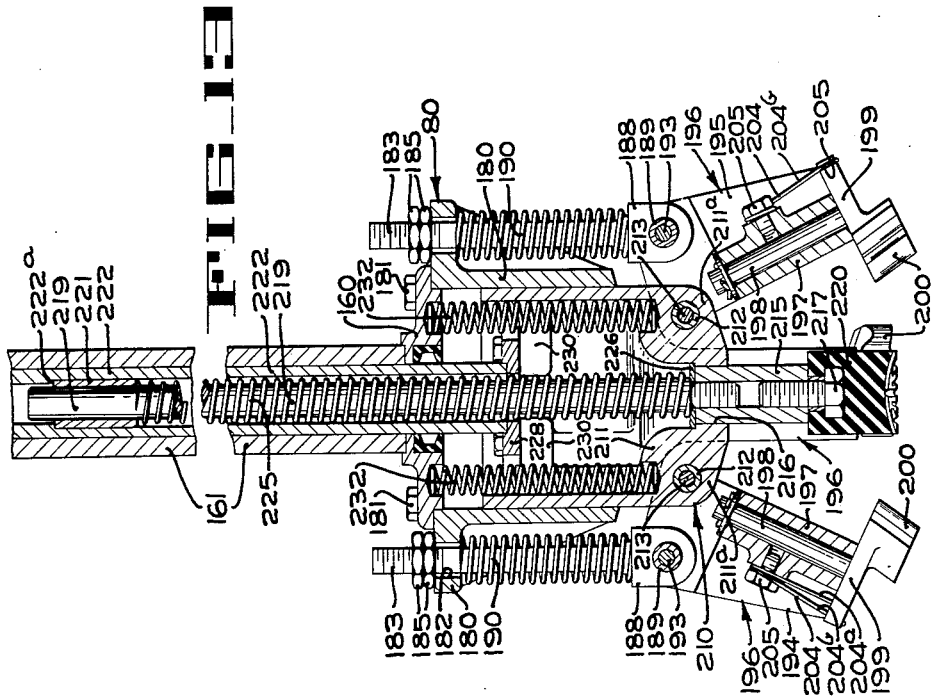
FIG. 11 is a vertical section taken on line 11—11 of FIG. 7.

The pitting machine of the present invention is illustrated in FIGS. 1, 2 and 4 as comprising a rigid base 20 having four posts 22 projecting upwardly from the upper surface of the base. Each post 22 has a flange plate 23 (FIG. 2) at its lower end which is bolted to the base 20. The upper end of each post is also provided with a flange plate (not shown) that is bolted to the lower wall of a rigid box-like housing 25 (FIGS. 1 and 4) which has four upstanding side walls 25a, 25b, 25c and 25d that form a liquid-tight enclosure. When the machine is in operation, the moving parts of the machine that are disposed in the liquid-tight enclosure, are liberally deluged with lubricating oil, which is stored in the enclosure, by means of a pump 26 that is mounted in the enclosure.

Power for driving the machine is obtained from an electric motor 30 (FIGS. 4 and 6) which is mounted exteriorly of the housing, in any suitable manner, and is arranged to rotate a drive shaft 31 through a belt and pulley drive 32. As seen in FIG. 4, the drive shaft 31 passes through the opposite walls 25b and 25d of the housing and is journalled in a bearing assembly 33 secured to each wall. Keyed on the drive shaft 31 are a pump drive sprocket 36 (FIG. 6), a face cam 37, a drive member 38a of a Ferguson drive mechanism 38, a second face cam 40, a second sprocket 41, and a cylindrical cam 42 to which is secured a disc cam 43. Ferguson drive mechanisms suitable for the present machine are described and illustrated in catalog No. 160 published by the Ferguson Machine Corporation of Indiana.

The Ferguson cam or drive member 38a is arranged to actuate two driven members 38b and 38c. The driven member 38b is arranged to intermittently index a vertical shaft 50, which is keyed to driven member 38b, through 60 degree increments of rotary movement. The vertical shaft 50 is journalled for rotation in bearing assemblies 51 (FIG. 1) disposed in a tubular support member 53 that is secured in an opening in the bottom wall of the housing 25. At its lower end the vertical shaft 50 carries a turret 60 which comprises a hub 61 and six pit-gripping blade assemblies 62a to 62f inclusive (FIG. 2). As the turret shaft 50 is intermittently rotated, each blade assembly is moved in a counterclockwise rotary path (FIG. 2) to six successive stations, indicated by reference letters, A, B, C, D, E, and F which are disposed at 60 degree intervals. At station A, a peach is moved onto a blade assembly when the blades are disposed in a vertical plane and are in an open, peach-receiving position. The next indexing movement of the turret causes the blade assembly to be moved to station B and, during this movement, the blades are moved to a closed position to cut into and through the meat of the peach all the way to the pit, which is then firmly gripped by the blades. Also, during this first indexing movement, the blades are rotated about a horizontal axis from the vertical position of station A to a horizontal position.

A twisting head 70, shown in FIG. 1 and indicated in phantom lines in FIG. 2, is mounted directly above station B of the turret. While the blade assembly with the peach thereon dwells at station B, the twisting head 70 is moved downwardly, in a manner to be explained presently, to engage and grip the half of the peach on the upper surface of the horizontal blade assembly. When the twisting head has gripped the peach, the head is rotated about a vertical axis causing the peach half to be twisted from the stationary pit. After the peach half is free from the pit, the gripper head is caused to release the peach half and allow it to remain on the upper surface of the blade assembly.

During the next indexing movement of the turret, the blade is rotated to a vertical position at station C (FIG. 2) and, during this rotary movement, the loose peach half is dropped onto a slanted plate 75 which is disposed below the path of movement of the blade assemblies. The slanted plate 75, which is supported from the base 20, is disposed within a rigid housing 76 that also encloses the turret. The peach half that drops on the slanted plate 75 is directed downwardly onto a belt conveyor 78 which conveys the pitted halves to a subsequent processing station in the cannery.

Next, the blade assembly with the pit and the remaining peach half are indexed to station D and the blade is rotated to a horizontal position with the remaining peach half disposed on the blade surface that is facing upwardly. A second twisting head 80 (FIGS. 1 and 2), which is mounted above the blade assembly at station D, is moved downwardly to grip the peach half and twist it free from the pit. Then, as the blade assembly is indexed to station E, the second half of the peach is dropped onto the conveyor 78. During the movement of the blade assembly from station E to station F, the blade assembly is rotated and the blades are moved to the open position, shown in FIG. 2, at station F causing the pit to drop directly onto a pit conveyor 82 or to be guided onto the conveyor by a slanted wall 81. The next indexing movement of the turret returns the blade assembly to the vertical open, peach-receiving position at station A.

Referring again to station B, it will be noted that, if the peach has a split pit, the peach half on the undersurface of the blades will drop downwardly when the upper half is twisted by the twisting head 70. The lower peach half drops directly onto a conveyor 83 or is guided toward the conveyor 83 by a slanted wall 84.

Accordingly, one of the features of the present machine is its ability to make a three way separation of parts of the peach; since peach halves having split pits are directed to conveyor 83, properly pitted peach halves are directed to conveyor 78, and pits are taken away on conveyor 82.

The turret 60 is connected to the turret shaft 50 by means of a key 85 (FIG. 7) disposed in adjacent slots in the hub 61 and in the shaft 50. The hub 61 is a generally cylindrical member having six longitudinal, vertically disposed slots 87 (FIGS. 7 and 8). The slots are spaced equi-angularly around the hub 61, one slot being associated with each blade assembly. A lever 90 is pivotally mounted in each slot 87 and carries, at its lower end, a follower roller 91 that rides on the peripheral camming surface of a cam 92 that is freely journalled on a sleeve 93 disposed on the turret shaft 50. The free rotation of the cam 92 relative to the shaft permits the cam to be held in fixed position, during rotation of the shaft, by an anchoring tie bar 95 (FIG. 2) extending between the cam 92 and a connector 96 secured to one of the support posts 22.

The camming surface of the cam 92, which is shown in FIG. 9, is so designed that each lever 90 is swung outwardly to contact a push rod 98 (FIG. 7) slidably journalled in a tubular pivot shaft 99 which projects radially outwardly from the hub 61. Each pivot shaft 99 has a slot 99b which receives the lever 90 and an inner extension 99a locked in a cylindrical socket 102 of the hub 61 by a stud 103. Each blade assembly 62a through 62f includes two blades 105 and 106 of the type described in detail in the pending application of Paul C. Wilbur, Serial No. 686,171, now U.S. Patent No. 2,954,063, which is assigned to the assignee of the present application. In general, each blade is a flat elongated member having a sharpened outer edge 107 and sharpened edges 108 and 109 formed in a pit gripping insert 110. A plurality of metal prongs 112 project along the concave edge of the insert 110 and these prongs are adapted to grip the pit of the peach. It will be understood that when the blades 105 and 106 are disposed in the open position shown at the right side of FIG. 7, a peach that is moved radially inwardly of the turret and into engagement with the blades will be split by the cutting edges 107, 108 and 109 of the blades. Then, when the blades are moved toward each other to their closed position, the pit gripping inserts 110 will cooperate to grip the pit and hold it in fixed position until the blades are opened again. It should be noted that, if the peach has a weak or split pit, the contact of the closing blades will break the pit and cause the severed peach halves to drop downwardly onto split pit conveyor 83.

As shown in connection with blade assembly 62d in FIG. 7, each blade assembly has a blade carrier 115 provided with a generally tubular body portion 116 supported on bearing assemblies disposed around the tubular pivot shaft 99. The carrier 115 has two wing portions 117 and 118, each of which has two spaced hubs 120 and 121 (FIG. 10). The two hubs 120 support a shaft 123, and the two hubs 121 support a shaft 124. The blade 106 is mounted on a hub 128a of an actuator arm 128 that is keyed to the shaft 124 and has an inner end portion 128b, shown in connection with blade assembly 62a in FIG. 7, that is arranged to be contacted by the associated push rod 98. The actuator arm 128 is secured to the blade 106 by three capscrews 129. It will be evident that, when the push rod 98 moves radially outwardly, it pivots the actuator arm 128 and the attached blade 106 toward the open position of the blade assembly. Similarly the blade 105 is mounted on a hub 132a (FIG. 10) of an actuator arm 132 that is secured to the blade 105 and has an inner end 132b arranged to be engaged by the push rod 98. As seen in FIG. 10 the inner end portions 132b and 128b are disposed close to each other so that they can be actuated simultaneously by the push rod.

The blades 105 and 106 are urged toward closed position by two springs 140 (FIG. 11) that are disposed between two transverse bars 141 and 142. A rod 143 which projects between the bars 141 and 142 maintains each spring in position between the bars. The bar 141 is disposed in a groove 144 (FIG. 7) in the inner end of the blade 105, and the bar 142 is disposed in a groove in the inner end of the blade 106. When the blades are pivoted to open position by the push rod 98, the springs 140 are compressed and, accordingly, are ready to move the blades to closed position when the push rod is permitted to swing inwardly.

Each blade assembly is rotated about the tubular pivot shaft 99, during each indexing movement of the turret 60, by means of a bevel gear 150 (FIG. 7) that is freely journalled on a bearing sleeve 151 that encircles the vertical turret shaft 50. The gear 150 is in mesh with six gears 152 (two only being shown in FIG. 7), one gear 152 being keyed to the blade carrier 115 of each blade assembly by a key 153. The bevel gear 150 is held in fixed, non-rotating position by a tie-bar 155 (FIG. 2) that is secured at one end to the upper surface of the gear 150 and, at the other end, is secured to a post 22 by a connector (not shown) that is identical to the connector 96 which secures tie bar 95 to the post 22. Thus, as the blade assemblies are carried bodily in a circular path by the hub 61, each blade assembly is rotated, due to the engagement of the associated gear 152 with the fixed gear 150, about the axis of the tubular pivot shaft 99, which axis will be referred to as the axis of the blade assembly.

The twisting head 80 (FIG. 1) has a top plate 160 to which is welded an upwardly projecting lifter tube 161. Near its upper end the lifter tube 161 carries a ring 163 in which diametrically opposite pivot pins 164 and 165 are secured. These pivot pins receive the arms of a yoke 167 (FIG. 4) formed on one end of a lever 169 that is pivotally mounted at the other end on a bolt 170 secured to the wall 25b of the housing 25. A follower roller 174 is pivotally mounted on the lever 169 intermediate its ends and is arranged to ride in the camming groove 170 (FIG. 5) of the previously mentioned face cam 37. It will be apparent that the continuously rotating drive shaft 31 periodically raises and lowers the lifter tube 161 and the head 80 attached thereto.

The twisting head 80 comprises an outer cylinder 180 (FIGS. 12 and 13) to which the cover plate 160 is secured by capscrews 181. The cylinder 180 has four openings 182 (two only being shown in FIG. 13) that are disposed at 90 degree intervals around the upper flanged end of the cylinder. A rod 183 projects through each opening 182 and each rod has a threaded upper end on which lock nuts 185 are disposed. The rod 183 is provided at its lower end with a block 188 which has a transverse opening fitted with a bushing 189. A spring 190 is disposed around each rod 183 between the block 188 and the upper flanged end of the cylinder. A capscrew 193 extends through the bushing 189 and through aligned openings 194a and 195a (FIG. 12) in two spaced arms 194 and 195, respectively, of a pad-support lever 196 so that the lever 196 is pivotally mounted on the lower end of the associated rod 183. Each pad-support lever 196 has a transverse, body portion 197 (FIG. 13) which is integrally formed with the arms 194 and 195, and has an opening arranged to receive a pin 198 which is riveted to a finger 199 on which a rubber facing 200 is molded. The facing 200 has a concave peach contacting surface that has a wavy or corrugated configuration. A torsion spring 204 is looped around a capscrew 205 threaded into the transverse body portion 197 and has one leg 204a (FIG. 12) abutting the inner surface of arm 194 and the other leg 204b disposed in hooked engagement in a slot 205 formed at the outer end of the finger 199. The torsion spring 204 rotates the associated finger about the axis of the pin 198 to a slightly turned position, illustrated by the center finger of FIG. 12, wherein one side edge of the concave facing 200 is disposed further away from the vertical axis of the head than the other. At the beginning of a twisting operation the springs move the fingers into gripping engagements with the surface of the peach.

The twisting head 80 also has an inner cylinder 210 (FIG. 13) which is slidably disposed in the outer cylinder 180 and has a bottom wall 211 with four equally spaced flanges 211a formed thereon (two only being shown). Each flange 211a has an opening in which is disposed a bushing 212 adapted to receive a capscrew 213, which also projects through openings (not shown) in the arms 194 and 195 to pivotally mount the pad-support lever 196 on the inner cylinder. A short internally threaded tube 215 is slidably mounted in a central opening 216 in the bottom wall 211. A rubber pad 220 is supported from the lower end of the tube 215 by a capscrew 217, and a rod 219 is threaded in the upper end of the tube to project upwardly therefrom. At its upper end the rod 219 is slidably journalled in a bushing 221 that is disposed against a shoulder 222a of an inner tubular twister shaft 222. A spring 225 is disposed around the rod 219 between the bushing 221 and a washer 226 which lies on the upper end of the short tube 215. At its lower end the inner tubular shaft 222 is secured, as by welding, to a transverse plate 228 that is bolted to four tabs 230 (two only being shown in FIG. 13) that project inwardly from the inner surface of the inner cylinder 210. Four compression springs 232 (two only being shown) are disposed between the lower wall 211 on the cylinder 210 and the cover plate 160.

To prevent rotation of the inner cylinder 210 relative to the outer cylinder 180, two capscrews 235 (FIG. 12) are threaded through tapped openings in the wall of the outer cylinder 180 and into a key 236 that is disposed in a slot 237 in the outer cylinder and in a slot 238 in the inner cylinder. A second pair of capscrews (not shown) are disposed diametrically opposite the capscrews 235 to lock a similar key between the inner and outer cylinders.

When the lifter tube 161 is lowered during the operation of the machine, the rubber pad 220 engages the upper surface of the peach. The sliding engagement of the short sleeve 215 in the wall 211 permits the inner cylinder 210 to move downwardly causing the spring 225 to be compressed to resiliently load the pad 220. The inner cylinder is moved downwardly until a lock nut 240 (FIG. 1), threaded on the upper end of the inner tubular shaft 222, engages a rubber stop member 242 secured on a thrust bearing 243 on a support casting 245 which extends across a portion of the upper end of the housing 25. The casting 245 is bolted to the top of the side walls of the housing and to a central partition 246 of the housing. Engagement of lock nut 240 with the stop member 242 stops the downward movement of the inner cylinder 210 (FIG. 12), and then further downward movement of the outer cylinder causes the outer cylinder to slide downwardly relative to the inner cylinder. The springs 232 are compressed and a force is transmitted through the four springs 190 tending to pivot the pad-support levers 196 inwardly so that the pads engage the outer surface of the peach half. After the twisting operation, which will be explained presently, the lifter tube 161 is moved upwardly causing the four rods 183 to first pivot the pad-support levers 196 outwardly away from the peach and then, acting through the levers 196 and capscrews 213, move the inner cylinder 210 upwardly.

Figure 12:
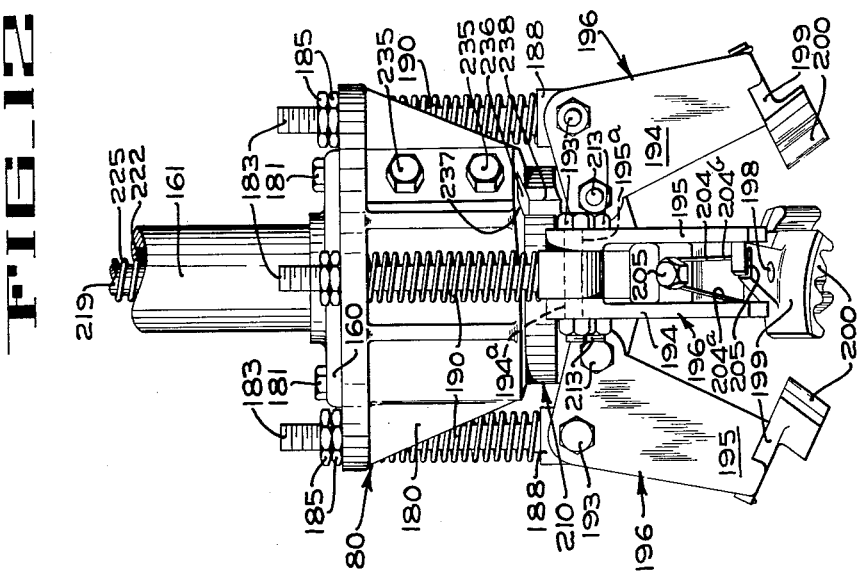
FIG. 12 is an enlarged elevation of one of the twisting heads used in the machine of FIG. 1.

The twister head 80 is rotated, to twist the peach half off the pit, by means of a gear 250 (FIGS. 1 and 6) that is keyed on the inner tubular twister shaft 222. The gear 250 is in mesh with a first idler gear 251 which is rotatably mounted on a shaft 252 that has a head 252a at its lower end and is threaded at its upper end to receive a nut 253. The shaft 252 is locked in a flanged sleeve 256 (FIG. 1) which is disposed in an opening in the support casting 245. A second idler gear 260, which meshes with the first idler gear 251, is supported on a shaft 261 from the support casting 245 in exactly the same manner as the first idler gear is supported. A drive gear 262 (FIGS. 1 and 6) which meshes with gear 260, is keyed to a vertical shaft 265 that is rotatably journalled in a bearing retainer sleeve 266. The sleeve 266 is best shown in FIG. 4 wherein it will be noted that an upper circular flange 266a of the sleeve is bolted to a horizontal platform 270 which is formed integral with the wall 25c and the partition 246 of the base 25. The second Ferguson driven member 38c (FIG. 6) is keyed to the lower end of the vertical shaft 265. Thus, during operation, the Ferguson drive intermittently rotates the vertical shaft 265 which in turn intermittently rotates the inner tubular shaft 222 of the twister head 80 through the gears 262, 260, 251 and 250. Referring again to FIG. 13, the inner shaft 222 rotates the inner cylinder 210, which in turn drives the outer cylinder 180 through the keys 236 (FIG. 12).

The other twister head 70 is identical to the twister head 80. Also, the head 70 is raised and lowered in an identical manner by means of a lever 300 (FIGS. 4 and 14) that is pivoted from wall 25a by a bolt 301. Intermediate its length, the lever 300 carries a roller 304 that rides in a camming groove 305 in the face cam 40 which, as previously mentioned, is also keyed to drive shaft 31. At its free end, the lever 300 carries a yoke 307 which is pivotally connected to a ring 308 keyed to an outer cylindrical shaft 310 of the twister head 70. An inner tubular shaft 312 (FIG. 1) is provided with lock nuts 313 and a gear 315 keyed thereon. The outer shaft 310 and the inner shaft 312 of the head 70 are identical in construction and operation to the outer shaft 161 and the inner shaft 222, respectively, of the head 80. Accordingly, a detailed description of the construction and operation of the head 70 will not be necessary. It will be noted in FIGS. 1 and 6 that the head 70 is twisted by the drive gear 262, that is keyed to the Ferguson drive shaft 265, through an idler gear 320. This idler gear 320 is supported from casting 245 on a shaft 321 in the same manner as the idler gears 251 and 260 are mounted.

As shown schematically in FIG. 19, peaches are fed to an open blade assembly at the feed station A by means of two feed members 350 and 351 each of which has a support arm 353 arranged to be oscillated by vertical rotatable shaft 354. Each feed member is movable from a position X at which a flat blade 356 mounted on the member receives a peach, to a position Y where the peach is impaled on a fixed blade 355, which is mounted on a fixed frame member 357 (FIG. 1) in coplanar relation with the blade assembly at feed station A and with the flat blade 356. Each blade 356 has a recess 356a disposed between a sharpened longitudinal edge 356b and a locating head or projection 356c. To position the peach on the feed member, the operator grasps the peach with both hands, adjusts the peach until its suture plane is vertical, and impales the peach on the blade 356 when it is momentarily stopped at position X. When the projection 356c has entered the stem end of the peach, the operator imparts a downward pivoting movement to the peach, causing it to be firmly impaled on the blade with the pits abutting the projection 356c and the sharpened edge 356b. If the peach has a particularly weak split pit, the pit may shatter as it is brought into contact with the blade 356. In this case the peach will be cut in halves as it is moved downwardly on the blade 356 and the halves will drop onto a slanted bottom wall 358 of the enclosure 76 and be directed onto the split pit conveyor 83.

After one of the feed members has impaled a peach on the fixed blade 355 at position Y, a pair of transfer cups 360 and 361 are moved inwardly from opposite sides of the blade 355 to engage the peach. When the peach is engaged, the cups are moved as a unit radially inwardly of the turret to remove the peach from the fixed blade 355 and position it between the open blades 105 and 106 of the blade assembly that is at the feed station A of the turret at this time.

The feed member 350 (FIG. 2) is moved from position X to position Y by rotation of the associated shaft 354. As seen in FIG. 3, the support arm 353 has a hub freely journalled on the shaft 354. A flanged hub 357 is keyed to the shaft 354 and has a socket 358 arranged to receive a ball 359 that is urged upwardly by a spring 363 mounted in a socket 364 in the hub of support arm 353. Under normal conditions, the hub 357 will drive the arm 353 through the ball 359. However, if the operator wishes to stop the movement of arm 353, a holding pressure exerted on the arm will cause the ball 359 to be cammed out of the socket 358. Rotation of shaft 354 is effected by a link 365 (FIG. 4) that is pivotally connected between an arm 366 that is keyed to shaft 354, and an arm of a bellcrank 367 which is pivotally mounted on a fixed vertical post 369. A tie rod 372 is pivoted at one end to the other arm of bellcrank 367 and, at its other end, is pivoted to a follower support arm 373 (FIG. 14) that is keyed on a shaft 375 (FIG. 4) that is rotatably mounted in wall portions of the housing 25. The follower support arm 373 carries a roller 377 (FIG. 14) that rides in a camming groove 378 of a face cam 380. The cam 380 is keyed to a shaft 381 which, as seen in FIG. 4, is rotatably mounted at one end in a bearing assembly 383 secured to wall 25d and at the other end in a boss 384 projecting inwardly from the wall 25a. A chain 390 is trained around a sprocket 391 keyed to shaft 381 and around the sprocket 41 keyed to drive shaft 31. It will therefore be evident that as the drive shaft 31 rotates, it rotates the face cam 380 causing the support arm 353 of feed member 350 to be oscillated to move the feed member 350 between peach receiving position X to peach impaling position Y.

Similarly, the feed member 351 (FIG. 4) is moved between positions X and Y by a link 400 pivotally connected to an arm 401 that is keyed to the shaft 354 to which the support arm 353 of feed member 351 is connected by a spring-loaded ball and socket drive, identical to the drive shown in FIG. 3. A cam follower support arm 402 (FIG. 15) is pivotally connected to link 400 and is keyed at its upper end to the rotatable shaft 375 which also carries the follower arm 373. A roller 404 which is mounted on arm 402 intermediate its length, is arranged to ride in a camming groove 405 of a face cam 406 that is keyed to the shaft 381 which is driven by chain 390. Since both of the face cams 380 and 406 are driven by shaft 381, it is evident that the feed members 350 and 351 are oscillated in timed relation. The cams 380 and 406 are so designed that, although the feed members are actuated successively, each feed member is held in position X until the other feed member has impaled a peach on the fixed blade 355 and returned to its position X.

Each of the transfer cups 360 and 361, which carry the peach from the fixed blade 355 to the open blades of the blade assembly at feed station A, is mounted on the lower end of a bar 410 (FIG. 16). At its upper end each bar 410 is bolted to a support member 411 (FIG. 17) that comprises two spaced bosses 412 and 413 connected by a front strap 414 and a rear strap 415. An arm 416 extends downwardly from boss 413 to receive the associated bar 410 in bolted relation. A rotatable roller 417 is connected on the strap 414 of each support member 411. A rod 420 (FIG. 1), that is fixed in two spaced brackets 421 and 422 supported from the lower wall of the housing 25, projects through the spaced bosses 412 and 413 of each support member 411 to support the member 411 for pivoting movement.

The two rollers 417 are disposed adjacent each other in the path of downward movement of an actuator plate 425 (FIGS. 1 and 16) carried on a pivotally mounted lever 426. A cam follower roller 428 (FIG. 16) is mounted on an arm 429 projecting upwardly from lever 426 through an opening in the bottom wall of the housing. This opening is sealed by a flexible membrane 427 that is bolted to the wall. The roller 428 rides along a camming surface 430 of the disc cam 43 which is secured to the cylindrical cam 42 that is keyed on drive shaft 31. When the roller follower 428 is moved downwardly by the camming surface 430, the lever 426 is swung downwardly causing the actuator plate 425 to engage the two rollers 417 and swing the cups 360 and 361 outwardly away from each other. A spring 433, which is connected between the lever 426 and the housing 25, urges the lever 426 upwardly so that the lever is periodically swung upwardly, under the control of the camming surface 430, to move the actuator plate 425 away from the rollers 417 and permit a spring 435, connected between the bars 410, to swing the cups 360 and 361 into gripping engagement with a peach impaled on the fixed blade 355.

The cups 360 and 361 are reciprocated toward and away from the blade assembly at feed station A by means of the cylindrical cam 42 which is arranged to oscillate a lever 434 (FIGS. 1 and 16) that has a roller 436 disposed in a camming groove 437. The lever 434 has a forked lower end disposed around two rollers 438 and 439 rotatably mounted on a bolt 440 extending through a rod 441. The rod 441, which is slidably disposed in a sleeve 445 (FIG. 1) in the wall 25d, has one end fixed in a plate 446 that also carries a lower rod 447 in parallel fixed relation to rod 441. A pusher unit 450 (FIGS. 16 and 17) is fixed to the inner end of the lower rod 447, and this pusher unit comprises a pair of spaced hubs 450a and 450b connected by straps 452 to a central hub 453 which receives the lower rod 447. As seen in FIG. 17, the hub 450b is disposed around rod 429 between the spaced bosses 412 and 413 of the cup support member 411. The hub 450a is similarly disposed between the bosses of the associated support member 411. Referring to FIG. 1 it will be evident that, when the cylindrical cam 42 is rotated, the lever 434 moves the parallel rods 441 and 447 radially inwardly or outwardly of the turret to move the transfer cups 360 and 361 toward or away from the blades of the blade assembly at feed station A. The rods 411 and 447 and plate 446 thus act as an actuating linkage for the transfer cups.

As previously mentioned, as the blade assembly leaves station E (FIG. 2) the blades are moved to open position to permit the pit to drop onto pit conveyor 82. If the pit adheres to one of the blades, it will be forced off the blades by a stationary ejector or scraper member 460 which is mounted above station F. The ejector member 460 is bolted to a bracket 461 that has an upstanding arm 462 secured to the wall 25a by bolts 464 (FIG. 4). The member 460 has a depending blade 465 which, as seen in FIG. 18, has a lower edge that is curved to permit the rotating blade assembly to move past the ejector blade 465 in closely spaced relation. Several positions of the rotating blades are shown in phantom lines in FIG. 18. Referring again to FIG. 2, it will be seen that a pit carried on either blade will come into contact with the depending ejector blade 465 just before the blades come to rest at station F or immediately upon leaving station F. It will be evident that if, for some reason a whole peach reaches station E without being pitted, the blade 465 will force it off the blade and cause it to drop onto the pit conveyor 82.

To put the machine into operation, the electric motor 30 (FIG. 6) is energized causing it to rotate the drive shaft 31. As the shaft 31 is continuously rotated, the twisting head lift cams 37 and 40 are rotated, as also are the Ferguson drive member 38a, the disc cam 43 which controls the movement of the transfer cups 360 and 361 radially of the turret.

In summarizing the operation of the machine, the progress of a single peach as it is moved through the machine will be followed with particular reference to FIGS. 1, 2 and 4. The peach P is positioned on the blade 356 of feed member 350 (FIG. 2) when it is momentarily held stationary at position X. The peach is so impaled on the blade that the suture plane of the peach is substantially in the plane of the blade and the pit of the peach is disposed with its long axis generally horizontal and substantially in the plane of the blade. As the drive shaft 31 rotates, the disc cam 380 (FIG. 4) is rotated to actuate the tie rod 372 and the associated linkage to swing the feed member 350 to position Y to impale the peach on the fixed vertical blade 355. When the peach is thus impaled, the disc cam 43 permits the roller 428 (FIG. 1) to move upwardly and allows the spring 435 (FIG. 2) to swing the cups 360 and 361 into gripping engagement with the peach. When the peach is firmly engaged, the cylindrical cam 42 (FIG. 1) swings the lever 434 in a direction to cause the pusher unit 450 to slide the cup support members 411 radially inwardly of the turret to remove the peach from the fixed blade 355 and impale it on the blades 105 and 106 that are held in open position at feed station A of the turret.

After the peach has been impaled on the open blades 105 and 106, the disc cam 43 (FIG. 1) forces the roller 428 downwardly, causing the actuator plate 425 to engage the rollers 417 and swing the transfer cups 360 and 361 away from the peach. The cam 42 then swings lever 434 in a direction to move the transfer cups radially outwardly of the turret to their initial position adjacent the fixed blade 355. The Ferguson drive 38 then indexes the turret to move the blade assembly to station B. During this movement, the cam 92 at the lower end of the turret shaft 50 permits the lever 90 to swing radially inwardly, allowing the springs 140 (FIG. 2) to move the blades toward each other to cut into the peach and grip the pit.

As the blade assembly moves to station B, the gear 152 (FIG. 2) associated with the blade assembly rolls along the fixed bevel gear 150 and effects a 90° rotation of the blade assembly about the longitudinal axis of the pivot tube 99 (FIG. 1) to move the blades to a horizontal position. The direction of rotation of the blade assembly is such that the blade 105, which is uppermost at station A, is trailing the blade 106 at station B, as shown in FIG. 2. When the blades have come to rest at station B, the face cam 40 (FIG. 1) lowers the twisting head 70 into gripping engagement with the peach half projecting upwardly from the blade assembly. The Ferguson drive then rotates the twisting head to twist the peach half free from the stationary pit. The twisting head is then raised by cam 40, releasing the peach half which remains on the blades.

The turret is again indexed to move the blade assembly to station C. During the movement toward station C, the blade assembly is again rotated 90° about its longitudinal axis. This 90° rotation moves the blade 106 (FIG. 2) upwardly and the blade 105 downwardly, causing the peach half to slide or tumble off the blades and be directed by the inclined wall 75 onto conveyor 78.

When the turret is next indexed to station D, the blade assembly is again rotated 90° about its axis to bring the remaining peach half into position below the twisting head 80. The cam 37 lowers the head 80 into gripping engagement with the remaining peach half, and the Ferguson drive rotates the head 80 to free the peach half from the pit. When the peach half is free from the pit, the head is moved upwardly causing it to release the peach half. Then, as the blade assembly is moved to station E, it is again rotated 90°, causing the peach half to drop downwardly onto conveyor 78.

When the blade assembly is rotated 90°, as it is moved to station F, the blades 105 and 106 are moved to open position by the associated push rod 98 which is moved outwardly at this time by the cam 92. Accordingly, the pit is released and dropped onto the pit conveyor 82. If the pit clings to one of the blades, it is cammed off the blade by the stationary ejector member 460. During the next indexing movement of the turret, the blade assembly is rotated to vertical position at feed station A and is ready to receive another whole peach from feed member 350.

From the foregoing description it will be evident that the present invention provides a novel, efficient method of twist-pitting peaches. The supporting of the turret from an overhead support makes possible an arrangement wherein the peach feed members are convenient to the operator and the blade assemblies are accessible for servicing. The particular arrangement of cams and Ferguson drive members provides a machine that may be operated at a high speed while efficiently pitting peaches. The novel oscillating feed members, the spring-loaded drive arrangement for these members, and the fact that each feed member momentarily comes to rest at the peach-receiving position makes it possible for the operators to feed peaches rapidly without the hazard accompanying the feeding of peaches to a positive-drive, rapidly moving blade. Further, the novel transfer cup mechanism of the present invention, which is arranged to move the cups and the fruit carried therein in a straight line path toward the fruit gripping blades, quickly and accurately impales each peach on the fruit gripping blades.

The movement of the blades in a horizontal path between a plurality of stations, and the arrangement of conveyors below the path of travel of the blades at predetermined positions provides a pitting machine which is capable of making a three-way separation of the pitted peach halves, the pits, and peach halves having split pit fragments.

It will be understood that modifications and variations of the embodiment of the invention disclosed herein may be made without departing from the scope of the invention.

Having thus described the invention, what is claimed as new and is desired to be protected by Letters Patent is:

1. A pitting machine comprising a pair of coplanar blades arranged to be moved into a whole peach to bisect the flesh of the peach and grip the pit, control means operatively connected to said blades and arranged to move said blades consecutively to three separate processing stations, means mounted adjacent said blades at the first two of said stations arranged to engage and twist a half of a peach whose pit is gripped by the blades to free the half from the pit, a first collector means disposed below said first station and positioned to receive peach halves dropping downwardly from the blades at said first station whereby to collect halves of peaches whose pits split during the twisting operation, means operatively connected to said blades to invert said blades as they are moved between said first and second stations, a second collector means positioned to receive peach halves twisted free from solid pits at the first and second stations, means disposed adjacent the path of movement of said blades for freeing each pit from the blades at the third station, and a third collector means disposed below said blades at said third station and arranged to receive each pit separated from the blades.

2. A pitting machine comprising a pair of coplanar blades arranged to be moved into a whole peach to bisect the flesh of a peach and grip the pit, means mounting said blades for rotation about an axis disposed longitudinally of and between said blades, control means operatively connected to said blades and arranged to rotate said blades about said axis to orient the peach at a first station with one peach half projecting upwardly from the blades and to orient the peach at a second station with the other half projecting upwardly, means for moving said blades between said stations, means adjacent said blades at each station for engaging and twisting the upwardly projecting peach half, a first collector means disposed below blades at said first station and arranged to receive peach halves dropping downwardly at said station whereby halves having split pit segments therein are collected in said first collector means, a second collector means, means for directing onto said second collector means peach halves twisted free from a solid pit at said first and second stations, means disposed adjacent the path of movement of said blades for removing the pit from said blades, and a third collector means arranged to receive pits removed from said blades.

3. A pitting machine comprising a rotary support member, a pair of blades mounted on said support member and arranged to be moved into a whole peach to bisect the flesh of the peach and grip the pit, control means operatively connected to said rotary support member and arranged to periodically rotate said member to move said blades consecutively to three processing stations, twisting heads disposed adjacent the path of movement of said blades at the first two of said stations and arranged to engage and twist a half of a peach whose pit is gripped by said blades to free the peach half from the pit, a first collector disposed below said blades at the first station in position to receive peach halves dropping downwardly from the blades at said first station whereby to collect halves of peaches whose pits are split during the first twisting operation, means operatively connected to said blades and arranged to invert said blades during movement between said first two stations, a second collector positioned to receive peach halves falling from said blades at said second station and during the movement of the blades from the first to the second station, means responsive to movement of said blades to said third station for moving said blades to open position, means at said third station disposed adjacent the path of movement of said blades for ejecting a pit from said open blades, and a third collector means disposed below said blades at said third station to receive pits ejected from the blades.

4. A machine for pitting peaches comprising a rotatable support member, a pair of blades pivotally mounted on said support member for movement from open to closed position, means for intermittently rotating said support member through predetermined angular distances, means for impaling a whole peach on said blades when said blades are in open position, means for moving said blades to closed position to bisect the meat portion of the peach to the pit and grip the pit, means adjacent said blades for twisting the peach half on one side of the cutting plane of said blades while said pit is held in fixed position, means for inverting said blades to position the remaining peach half on said one side of said cutting plane, and means adjacent said blades on said one side of said cutting plane for twisting said remaining peach half while holding the pit in fixed position.

5. A pitting machine comprising a rotatable support member, a pair of coplanar blades carried by said rotatable support member and arranged for pivotal movement from an open to a closed position to cut through and bisect the flesh of a peach and firmly grip the pit, means for successively indexing said rotatable support member to move said blades to a plurality of stations including two spaced fruit twisting stations, means for inverting said blades as they are moved between said stations whereby a peach half facing downwardly at the first station will be facing upwardly at the second station, a twisting head disposed above said blade assembly at each of said fruit twisting stations and arranged to successively engage and twist each peach half while the pit is held by said blades, and means for simultaneously rotating said twisting heads.

6. A machine for pitting peaches comprising, a rotatable support member, a blade assembly rotatably mounted on said support member, means for positioning a whole peach on said blade assembly, means on said assembly for gripping the pit of the peach, means for rotating said blade assembly to a position wherein one peach half projects upwardly from said blades and the other projects downwardly from said blades, means mounted above said blade assembly and movable relative thereto for gripping and twisting the upwardly projecting peach half while holding the pit in fixed position to free the peach half from the pit, means responsive to movement of said support member for rotating said blade assembly to discharge the disconnected peach half and to move the remaining peach half to an upwardly projecting position, and means mounted above said blades and movable relative thereto for twisting the remaining peach half from the pit.

7. A pitting machine comprising a turret, two cutting and gripping members mounted on said turret for circular movement in a fixed plane, each member including two coplanar blades arranged when actuated to cut into a whole peach and grip the pit, means for actuating each pair of blades, a pair of spaced twisting heads mounted adjacent said turret on the same side of said plane and arranged to be moved into gripping engagement with peach halves supported by said blades, means for indexing said turret to simultaneously align a pair of blades with each of said twisting heads with a peach half projecting away from said blades toward the twisting head, means for inverting said blades during movement of said turret to successively present the two halves of a peach to said heads, and means for moving said heads into gripping engagement with a peach half aligned therewith.

8. A pitting machine comprising a turret, two cutting and gripping members mounted on said turret, each member including a pair of coplanar blades movable bodily with said turret and rotatable relative thereto, and each pair of blades being arranged when actuated to move from an open to a closed position to cut into a whole peach and grip the pit, means for actuating said blades, a pair of spaced twisting heads mounted adjacent said turret and arranged to be moved into gripping engagement with peach halves supported by said blades, means for indexing said turret to simultaneously align a pair of blades with each of said twisting heads with a peach half projecting away from said blades toward each twisting head, means for rotating each pair of blades 180° during movement from a position of alignment with one of said twisting heads to a position of alignment with the other head, and means for moving said heads into gripping engagement with a peach half aligned therewith.

9. A machine for pitting peaches comprising pit gripping means for making a planar cut in a whole peach to bisect the flesh of the peach to the pit and grip the pit, means mounting said gripping means for rotation about a horizontal axis and for bodily movement from a first station to a second station, a first twisting head mounted at the first station on one side of the cutting plane for movement into engagement with a peach half on said one side of the cutting plane, means for rotating said twisting head to free the peach half from the pit, actuating means for moving said pit gripping means from the first station to the second station, gear means interconnecting said gripping means and said actuating means whereby movement of said gripping means between said stations effects rotary movement of said gripping means to position the remaining peach half on said one side of said cutting plane, a second twisting head on said one side of said cutting plane mounted for movement into gripping engagement with said remaining peach half, and means for rotating said second twisting head.

10. In a pitting machine, a housing having a bottom wall and upstanding side walls, a support casting extending part way across the open upper end of said housing, and a drive mechanism comprising a power input shaft extending through an opening in one side wall of said housing, a turret drive shaft driven from said input shaft and journalled in said housing, a fruit support carried by said turret shaft, a lifter tube projecting in sliding relation through an opening in said bottom wall, a fruit twisting head mounted on the lower end of said tube for vertical movement therewith relative to a fruit disposed on said fruit support, a twister shaft keyed to said lifter tube, a transfer cup actuating mechanism slidably disposed in an opening in one side wall and arranged to deliver fruit to said fruit support, a mechanism operatively connecting said input shaft to said twister shaft including idler gears supported from said support casting, a driven shaft rotatably journalled in an opening in said bottom wall, and means connecting said power input shaft in driving engagement with said driven shaft and said transfer cup actuating mechanism, and means rotating said input shaft to drive said turret shaft and said twister shaft in synchronism with the actuation of said lifter tube and said transfer cup actuating mechanism.

11. In a pitting machine, a fruit gripping blade unit having a pair of elongated blades and means defining an axis for said unit extending longitudinally of said blades, means for moving said unit along a predetermined path, means for rotating said unit about said longitudinal axis during movement along said path, and a fruit ejector member mounted adjacent said predetermined path and having a fruit contacting surface curved to conform closely to the curved path of said rotating blade unit as it is moved along said predetermined path whereby said rotating blades pass closely adjacent said ejector surface without contact therewith.

12. In a pitting machine, a support structure, a power driven input shaft rotatably supported in said structure, a turret shaft rotatably journalled in said structure, a turret keyed to said drive shaft, a lifter tube slidably and rotatably journalled in said structure, a twister shaft slidably journalled in said lifter tube, a twisting head arranged to be raised and lowered by said lifter tube and rotated by said twister shaft, and means operatively connecting said input shaft in driving relation to said turret shaft, said lifter tube and said twister shaft and including control means arranged to cause said input shaft to consecutively index said turret shaft through a predetermined angular movement, hold said turret shaft in fixed position, lower said lifter tube, rotate said twister shaft, and then raise said lifter tube.

13. In a machine for pitting peaches, a rotatable support member, a blade assembly having a longitudinal axis and a pair of elongated opposed blades disposed on opposite sides of said axis, said blades being arranged to bisect and hold a peach therebetween, means mounting said blade assembly on said support member for rotation about said axis, means for moving said support member through predetermined angular movements, and means responsive to movement of said support member and operatively connected to said blade assembly for rotating said blade assembly about said longitudinal axis during each angular movement of said support member to invert a peach held by said blades.

14. In a pitting machine, a housing, a rotatable shaft having a portion projecting into said housing, a disc cam rotatably journalled on said shaft portion, a drive gear rotatably journalled on said shaft portion, a gear driven mechanism carried by said shaft and operatively associated with said drive gear, a cam actuated mechanism carried by said shaft and operatively associated with said disc cam, and tie rods connected between said drive gear and said housing and between said disc cam and said housing and arranged to hold said drive gear and said disc cam in fixed non-rotating position during rotation of said shaft.

15. In a peach pitting machine, a rotatable hub, a pair of coplanar blades pivotally mounted on said hub, an actuator arm secured to each blade, a push rod slidably disposed in said hub and having an edge in contact with the actuator arms of said blades, a cam mounted in fixed position adjacent said hub, and a lever pivotally mounted on said hub and having a first portion disposed in contact with said cam and a second portion in contact with said push rod, whereby rotary movement of said hub moves the first portion of said lever along said cam to cause said second portion to slide said push rod along said hub to effect pivoting of said blades.

16. In a pitting machine, a turret comprising a rotatable support member having a plurality of radially extending slots, a pivotally mounted cam lever disposed in each slot, a pair of coplanar blades pivotally mounted on said support member in radial alignment with each slot, a stationary cam adjacent said support member having a camming surface in engagement with each of said levers, means operatively connecting each lever with one of said pairs of blades so that actuation of said lever by said cam effects pivoting of said one pair of blades, and means for rotating said rotatable support member.

17. In a peach pitting machine, a rotatable hub, a tubular support member having two pairs of aligned hubs, means rotatably mounting said tubular support member on said hub, a shaft disposed in each pair of aligned hubs, a pair of coplanar blades, one blade being pivotally mounted on each shaft, means defining pit gripping means on each blade on one side of said shaft, means defining a slot in each blade at a point on the other side of said shaft, a bar disposed in the slot at the end of each blade and extending transversely of said blade, and a pair of springs disposed between said bars and arranged to pivot said blades in a direction to move said gripping means toward each other.

18. A pitting machine comprising a feed blade adapted to receive and hold a peach in impaled relation, a rotary support member disposed in spaced relation to said blade, a pair of pit-gripping blades mounted on said rotary support member and arranged to be moved into a whole peach presented thereto at a transfer station to bisect the flesh of the peach and grip the pit, means for transfer-ring a fruit from said feed blade to said pit-gripping blades, control means operatively connected to said rotary support member and arranged to periodically rotate said member to move said blades consecutively from said transfer station to three processing stations, twisting heads disposed adjacent said rotary support member at the first two of said stations and arranged to engage and twist a half of a peach whose pit is gripped by said blades to free the peach half from the pit, means operatively connected to said pit-gripping blades to invert said blades as they are moved between said first two stations, a first collector disposed below said blades at the first station and at said transfer station to receive peach halves dropping from said blades at said stations whereby to collect halves of peaches whose pits are split during the movement of said blades to pit-gripping position and during the first twisting operation, means disposed below said feed blade for intercepting peach halves split while being impaled on said feed blade and directing said halves to said first collector, a second collector positioned to receive peach halves falling from said blades at said second station and during the movement of the blades from the first to the second station, means responsive to movement of said blades to said third station for moving said blades to open position, means at said third station for forcing peach parts from said blades, and a third collector disposed below said blades at said third station to receive peach parts forced from the blade.

References Cited in the file of this patent

UNITED STATES PATENTS

| | | | |
|---|---|---|---|
| 580,563 | Totten | Apr. 13, | 1897 |
| 1,365,397 | Gormleg et al. | Jan. 11, | 1921 |
| 1,775,225 | Jorgensen | Sept. 9, | 1930 |
| 1,794,479 | Smith | Mar. 3, | 1931 |
| 1,901,042 | Robbins | Mar. 14, | 1933 |
| 1,951,804 | MacDougall | Mar. 20, | 1934 |
| 2,071,664 | Sneva | Feb. 23, | 1937 |
| 2,216,165 | Ewald et al. | Oct. 1, | 1940 |
| 2,429,346 | Dunn | Oct. 21, | 1947 |
| 2,431,310 | Coons | Nov. 25, | 1947 |
| 2,468,255 | Dunn | Apr. 26, | 1949 |
| 2,588,575 | Rollins | Mar. 11, | 1952 |
| 2,594,362 | Skog | Apr. 29, | 1952 |
| 2,664,127 | Perrelli | Dec. 29, | 1953 |
| 2,704,561 | Thompson | Mar. 22, | 1955 |
| 2,775,279 | Perrelli | Dec. 25, | 1956 |
| 2,788,819 | Guatelli et al. | Apr. 16, | 1957 |
| 2,818,098 | Perrelli | Dec. 31, | 1957 |
| 2,826,227 | Perrelli et al. | Mar. 11, | 1958 |